Oct. 20, 1925.
M. M. HOUSTON
1,557,842
TURN SIGNAL FOR AUTOMOBILE MACHINES
Filed March 1, 1924
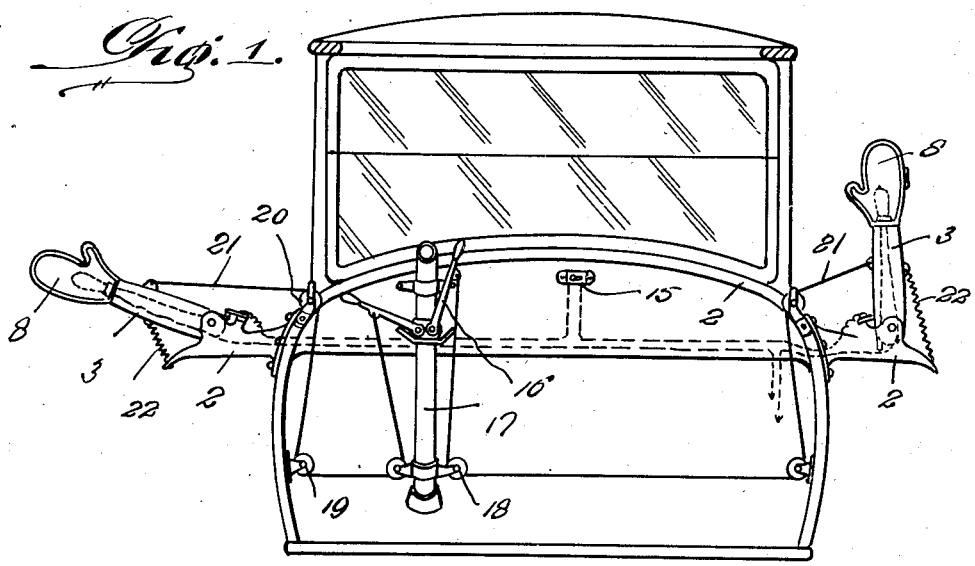
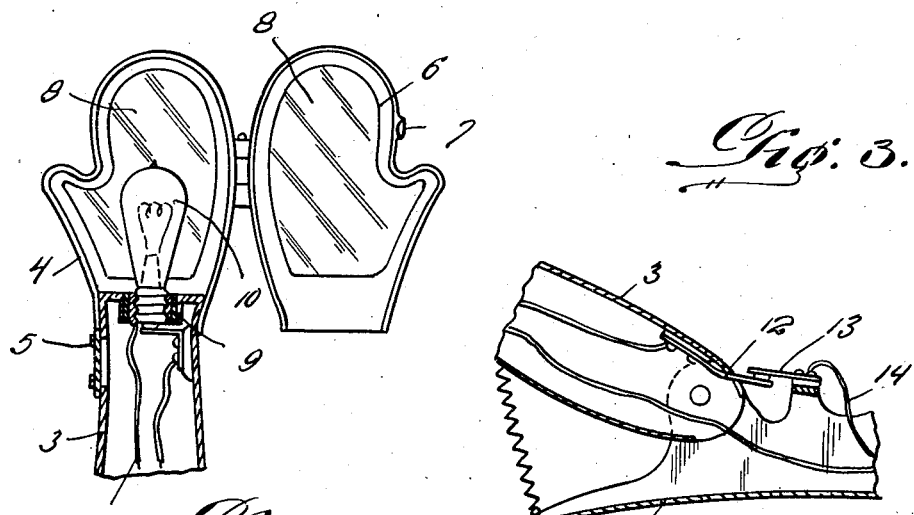
M. M. Houston,
Inventor
By _____ Attorney Patented Oct. 20, 1925.

1,557,842

UNITED STATES PATENT OFFICE.

MARVIN M. HOUSTON, OF MERCER, MISSOURI.

TURN SIGNAL FOR AUTOMOBILE MACHINES.

Application filed March 1, 1924. Serial No. 696,313.

*To all whom it may concern:*

Be it known that MARVIN M. HOUSTON, a citizen of the United States, residing at Mercer, in the county of Mercer and State of Missouri, has invented certain new and useful Improvements in Turn Signals for Automobile Machines, of which the following is a specification.

This invention relates to a signal adapted to be used upon an automobile machine for indicating the direction in which the machine is about to make a turn and it consists in the novel features hereinafter described and claimed.

An object of the invention is to provide a signal structure of the character stated of a simple nature and which may be easily and quickly manipulated by the driver of the automobile machine by swinging levers which are mounted upon the steering post and which are operatively connected with arm members pivotally mounted at the sides of the body of the machine, the arm members being arranged to swing from normal vertical positions to horizontal positions when the signal is indicated or displayed. The arm members carry casings in the form of hands and these casings are provided with transparent sides. Electric bulbs are located in the casings and electric conducting means are provided for illuminating the bulbs when the arms are swung to the horizontal positions.

In the accompanying drawing:

Figure 1 is a vertical side elevation of the signal, showing the same applied to the body of an automobile machine.

Figure 2 is a fragmentary sectional view of one of the arm members of the signal showing the sections of the hand casings in open position with relation to each other.

Figure 3 is an enlarged detailed sectional view of fragments of the arm member of the signal and the elbow bracket to which it is pivotally attached.

The signal structure comprises elbow bracket members 1 which are applied to the opposite sides of the body of the automobile machine and which is indicated at 2 in Figure 1 of the drawing. Tubular arm members 3 are pivotally connected with the outer portions of the elbow brackets 1. Casings 4 are detachably connected with the outer ends of the arm members 3 by means of bolts 5 or similar securing devices. The casings 4 are provided with hinged doors 6 and the doors 6 are provided with clasps 7 adapted to engage over the edges of the body portions of the casings and hold the doors at closed positions with relation to the bodies of the casings. The bodies of the casings and the doors are in the general shape of the human hand. The bodies of the casings and the doors are provided with openings which are covered by a transparent sheet 8 of glass or other suitable material. Lamp sockets 9 are provided at the outer free ends of the arm members 3 and electric bulbs 10 are screwed into said sockets 9. Current wires 11 connect with the sockets and the bulbs 10 in a usual manner and extend through the arm sections 3. Some of the wires 11 connect with batteries (not shown) and other of the wires 11 connect with terminals 12 mounted within the arm sections 3. The terminals 12 are adapted to have contact with the terminals 13 mounted upon the elbow brackets 1 when the arm sections 3 are swung from vertical positions to the substantially horizontal positions. Wires 14 connect the terminals 13 with a switch 15 disposed at the inner ends of both of the wires 14 and which may be used for closing the circuit between the inner ends of the wires 14.

Levers 16 are pivotally mounted upon the steering post 17 of the automobile machine and pulleys 18 are journalled at the lower portion of the said post. Pulleys 19 are journalled at the lower portion of the body 2 and at the inner side thereof and pulleys 20 are journalled at the upper portions of the body 2. Cables 21 are attached at their inner ends to the levers 16 and the said cables are trained under the pulleys 18 and 19 and over the pulleys 20 and the outer ends of the said cables are connected with the arm members 3 at points between the ends thereof. Coil springs 22 are secured at one end to the intermediate portions of the arm members 3 and connected at their other ends with the outer end portions of the bracket members 2. The coil springs 22 normally hold the arms in the extended position as is shown to the left in Figure 1, at which time the contacts 12 and 13 act as stops to limit the movement of the arm.

When one or the other of the levers 16 is swung to an upright position as shown at the right in Figure 1 of the drawing, the attached cable 21 is moved longitudinally whereby the arm 3 at the same side of the body 2 of the vehicle is swung from a horizontal position to an upright position. Thus the spring 22 is stretched. Under normal conditions, the arms 3 are disposed vertically. When the automobile machine is about to make a turn, the operator lowers that lever 16 at the side of the machine which is disposed in the direction in which the machine is to be turned and the attached cable 21 is slackened whereby the tension of the spring 22 comes into play and the attached arm 3 is swung from a vertical position to a horizontal position. This will indicate to traffic at the rear and in advance of the machine carrying the signal that the machine is about to make a turn in the direction indicated.

When the signal is used at night, the switch 15 is manipulated whereby the wires 14 are electrically connected with each other. This is done at night and in order that the signal may be observed in the dark. When the switch 15 is moved to a closed position and one or the other of the arm members is swung from a vertical to a horizontal position, the contact member 12 carried by the said arm member is swung into engagement with the contact member 13 upon the adjacent bracket 1. Thus an electric circuit is completed to the bulb 10 which is carried by the said arm member and the bulb is illuminated and may be observed through the transparencies 8 which are carried by the body of the casing 4 and the hinged section 6 thereof.

Having thus described the invention, what is claimed is:

In a turn signal device, a bracket member adapted to be fixed at one end to a vehicle, said bracket member being U-shaped in cross section, an arm pivoted between the sides of the bracket member intermediate its ends, a contact extending from the arm, a second contact extending from the bracket member, the first contact adapted to engage the second contact for holding the arm in an extended substantially horizontal position, a spring attached to one end of the bracket member and to the arm for normally holding the arm in an extended substantially horizontal position with the contacts engaged, and means for raising the arm.

In testimony whereof I affix my signature.

MARVIN M. HOUSTON.